(12) United States Patent
Kapanen et al.

(10) Patent No.: US 8,281,252 B2
(45) Date of Patent: Oct. 2, 2012

(54) USER INTERFACE COMPONENT

(75) Inventors: Jussi Kapanen, Järvenpää (FI); Sami Tyni, Pirkkain (FI); Juhani Väättänen, Kangasala as (FI); Juha Kukkonen, Tampere (FI); Jari Kettunen, Vantaa (FI)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 11/885,531

(22) PCT Filed: Mar. 3, 2005

(86) PCT No.: PCT/FI2005/050058
§ 371 (c)(1),
(2), (4) Date: Aug. 31, 2007

(87) PCT Pub. No.: WO2006/092464
PCT Pub. Date: Sep. 8, 2006

(65) Prior Publication Data
US 2008/0189645 A1    Aug. 7, 2008

(51) Int. Cl.
*G06F 3/048*    (2006.01)
*G06F 3/00*    (2006.01)

(52) U.S. Cl. ......... 715/777; 715/786; 715/788; 715/853

(58) Field of Classification Search ................... 715/777, 715/782, 786, 788, 801, 818, 829, 841, 853
See application file for complete search history.

(56) References Cited

U.S. PATENT DOCUMENTS

| | | | |
|---|---|---|---|
| 5,305,435 A * | 4/1994 | Bronson | 715/777 |
| 5,604,861 A | 2/1997 | Douglas et al. | |
| 5,758,111 A | 5/1998 | Shiratori et al. | |
| 6,166,736 A | 12/2000 | Hugh | |
| 6,498,613 B1 * | 12/2002 | Wajima | 715/775 |
| 6,515,684 B1 | 2/2003 | Knodt | |
| 2002/0163545 A1 | 11/2002 | Hii | |
| 2002/0186257 A1 * | 12/2002 | Cadiz et al. | 345/838 |
| 2002/0198906 A1 | 12/2002 | Press | |
| 2003/0071849 A1 | 4/2003 | Ferri | |
| 2003/0107593 A1 * | 6/2003 | Domenico | 345/752 |
| 2004/0212640 A1 * | 10/2004 | Mann et al. | 345/792 |
| 2004/0255254 A1 | 12/2004 | Weingart et al. | |
| 2005/0198584 A1 * | 9/2005 | Matthews et al. | 715/779 |

FOREIGN PATENT DOCUMENTS

| | | |
|---|---|---|
| EP | 0 841 609 | 5/1998 |
| GB | 2 339 128 | 1/2000 |

OTHER PUBLICATIONS

Creating a GUI with JFC/Swing. How to Use Tabbed Panes, Tutorial, Sun Microsystems, Inc., 2004, printed from the internet Oct. 10, 2005. http://web.archive.org/web/20041012052204/http://java.sun.com/docs/books/tutorial/uiswing/components/tabbedpane.html>.
IBM Technical Disclosure Bulletin, "Notebook Tabs as Target Location for Drag/Drop Operations", vol. 35 No. 7, Dec. 1992, p. 207.

* cited by examiner

*Primary Examiner* — Nicholas Augustine
(74) *Attorney, Agent, or Firm* — Harrington & Smith

(57) ABSTRACT

A sliding tab tabbed pane user interface component implementable in an electronic device is presented. The user interface component provides a user interface of the electronic device with items belonging to a plurality of different categories, each category being associated with a different sliding tab. The sliding tabs are arranged such that at least a portion of the items of at least two sliding tabs is visible.

25 Claims, 3 Drawing Sheets

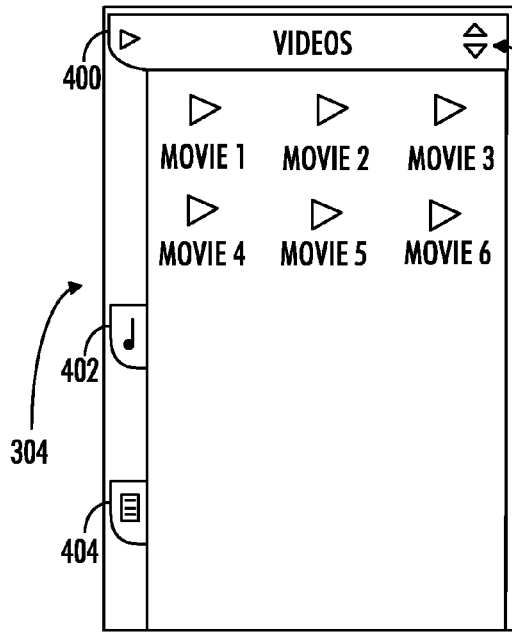
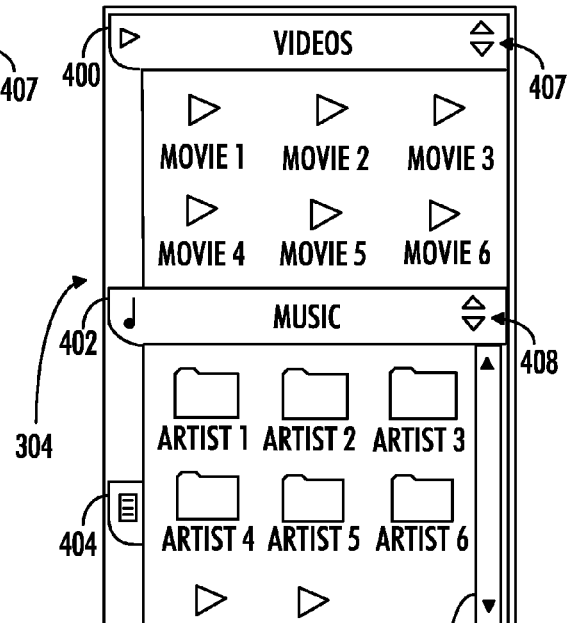
FIG. 4A
FIG. 4B
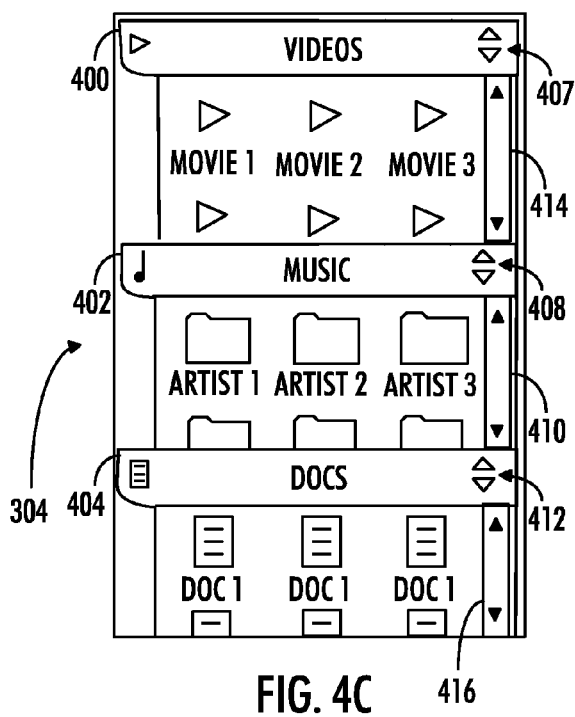
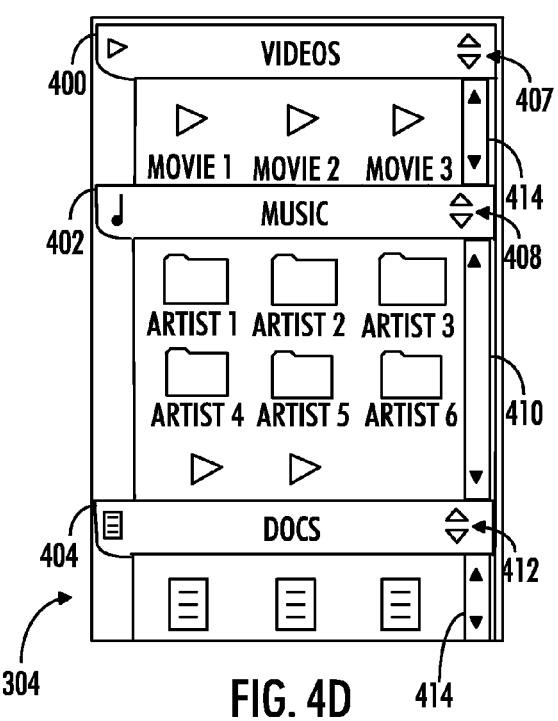
FIG. 4C
FIG. 4D

USER INTERFACE COMPONENT

FIELD

The invention relates to a user interface component of an electronic device.

BACKGROUND

A tabbed pane is a widely used user interface component that allows stacking information behind several tabs. Tabbed panes are used in environments where there is a need to display items in different categories. Each category is then associated with a different tab. A tabbed pane user interface component is also used when a display unit of an electronic device is so small that all the desired components cannot be shown simultaneously in the display unit. FIGS. 1A and 1B illustrate a prior art tabbed pane. A tabbed pane 102 is displayed in a display unit 100 of an electronic device. In the tabbed pane 102, information is stored in three different categories (movies, music, and documents) each represented by a tab 106, 108, and 110, respectively. In FIG. 1A the contents of the videos category 104 are visible, while the contents of other categories are hidden. They are, however, accessible by clicking on a desired tab. For example, if the music category tab 108 is clicked, the contents of the music category 112 are displayed and the contents of the videos category 104 are hidden. The contents of each category may comprise files, folders, shortcuts, links, directory structures, etc.

A drawback of the tabbed pane solution is that the contents of only one category or tab can be displayed at a time. Another drawback is that moving or copying files from one category to another is cumbersome since the tabbed pane solution does not support dragging and dropping between different tabs.

BRIEF DESCRIPTION OF THE INVENTION

An object of the invention is to provide an improved solution for processing data in an electronic device utilizing a tabbed pane user interface component.

According to an aspect of the invention, there is provided a data processing method in an electronic device, the method comprising providing a user interface of the electronic device with items belonging to a plurality of different categories. The method is characterized by further comprising associating each category with a different sliding tab of a tabbed pane user interface component and arranging the sliding tabs such that at least a portion of items of at least two sliding tabs are visible.

According to another aspect of the invention, there is provided an electronic device comprising a user interface for input and output of information and a control unit configured to provide the user interface of the electronic device with items belonging to a plurality of different categories. The control unit is further configured to associate each category with a different sliding tab of a tabbed pane user interface component and arrange the sliding tabs such that at least a portion of items of at least two sliding tabs are visible.

According to another aspect of the invention, there is provided a computer program product encoding a computer program of instructions for executing a computer process for processing data in an electronic device. The process comprises providing a user interface of the electronic device with items belonging to a plurality of different categories, associating each category with a different sliding tab of a tabbed pane user interface component, and arranging the sliding tabs such that at least a portion of the items of at least two sliding tabs are visible.

According to yet another aspect of the invention, there is provided a computer program distribution medium readable by a computer and encoding a computer program of instructions for executing a computer process for processing data. The process comprises providing a user interface of the electronic device with items belonging to a plurality of different categories, associating each category with a different sliding tab of a tabbed pane user interface component, and arranging the sliding tabs such that at least a portion of the items of at least two sliding tabs are visible.

The provided so-called sliding tab tabbed pane solution provides several advantages in addition to the advantages of the conventional tabbed pane user interface component. Contents of several sliding tabs can be displayed simultaneously. The maximum number of sliding tabs, whose contents are displayed, is limited only by the space available for tabbed pane. Additionally, moving or copying items from one tab to another is simple just by dragging and dropping the desired item from one tab to another. Advantages over conventional tabbed pane user interface component increase with the size of display space, since there is more space available to display contents of several tabs, while for the conventional tabbed pane there is only more space to display contents of one tab.

LIST OF DRAWINGS

In the following, the invention will be described in greater detail with reference to the embodiments and the accompanying drawings, in which FIG. 1A shows a prior art tabbed pane user interface component;

FIG. 4A illustrates an example of a sliding tab tabbed pane user interface component according to an embodiment of the invention;

FIG. 4B illustrates an example of a sliding tab tabbed pane user interface component according to an embodiment of the invention;

FIG. 4C illustrates an example of a sliding tab tabbed pane user interface component according to an embodiment of the invention;

FIG. 4D illustrates an example of a sliding tab tabbed pane user interface component according to an embodiment of the invention;

DESCRIPTION OF EMBODIMENTS

Figure 1A:
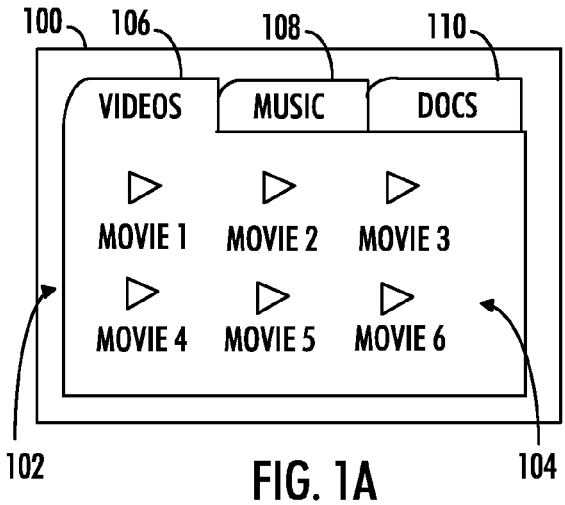
FIG. 1B shows another prior art tabbed pane user interface component.
Figure 1B:
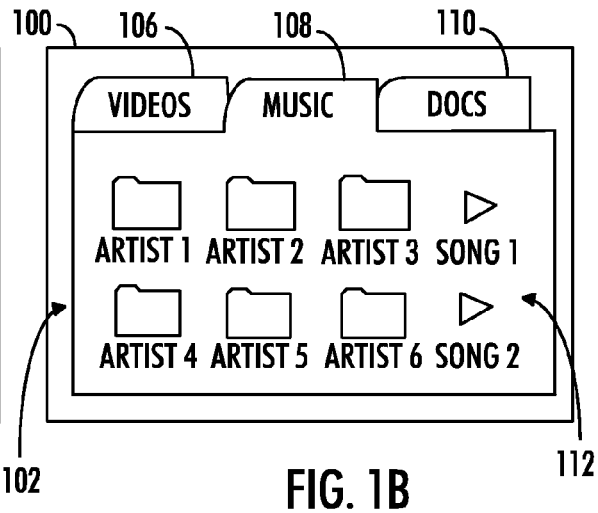
Figure 2:
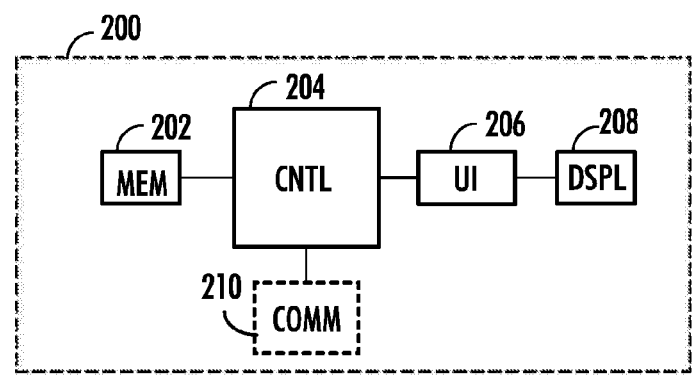
FIG. 2 illustrates an example of a structure of an electronic device according to an embodiment of the invention.

FIG. 2 illustrates an example of a structure of an electronic device 200 according to an embodiment of the invention. The electronic device 200 may be for example a computer, a laptop, a PDA (Personal Digital Assistant), or a mobile communication device. The electronic device 200 may also be a combination of two electronic devices, such as a computer with a mobile communication device connected to the computer.

The electronic device 200 comprises a user interface 206 which may comprise at least one display unit 208 for displaying information. The user interface 206 may also comprise a keyboard, a mouse and/or another user input device. The user interface 206 may also be implemented with a touch sensitive display.

The electronic device 200 comprises a control unit 204 connected to the user interface 206. The control unit 204 takes care of controlling the operation of the electronic device 200. The control unit 204 also comprises means for processing information received from an input device of the user interface 206, and means for displaying information in the user interface 206. The control unit 204 further comprises means for controlling the operation of the user interface components of the electronic device 200. The control unit 204 may be implemented with a digital signal processor applying a suitable software or with separate logic circuits, for example ASIC (Application Specific Integrated Circuit).

The electronic device 200 further comprises a memory unit 202 connected to the control unit 204. The memory unit 202 stores data required for the operation of the electronic device 200. The memory unit 202 may store applications used in the electronic device 200 but also any information input to the electronic device 200.

The electronic device 200 may optionally comprise a communication unit 210 connected to the control unit 204. The communication unit provides means for communicating with other electronic devices. The communication unit 210 may transmit and receive information using a wireless communication system, such as GSM (Global System for Mobile Communications), UMTS (Universal Mobile Telecommunications System), Bluetooth®, or WLAN (Wire-less Local Area Network). Alternatively, the electronic device may be connected to a fixed network, such as Ethernet, through a wired connection.

Figure 3:
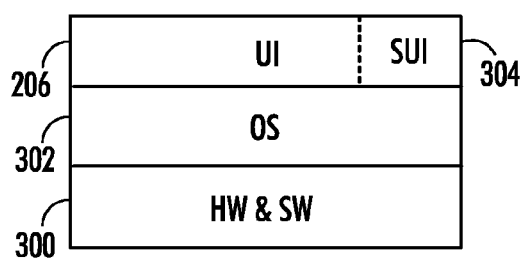
FIG. 3 illustrates an example of a software architecture according to an embodiment of the invention.

FIG. 3 describes an example of the software architecture of the electronic device. The lowest layer comprises the hardware of the electronic device and the software 300 controlling the operation of the hardware and, in particular, the operation of the control unit 204. An operating system 302 handles start and execution of computer programs in the electronic device 200. The operating system provides an interface between the hardware and software applications of the electronic device 200. The operating system (OS) 302 may be for example a Windows® OS, a Macintosh ® OS, a Java ® based OS, a Linux® OS or a Symbian™ OS, which is a widely used operating system in mobile communication devices. The invention is not, however, limited to these operating systems, and the operating system 302 may be any other operating system. Applications executed in the electronic device 200 comprise applications related to the user interface 206 of the electronic device 200. A specific user interface component 304 is a component for displaying information by means of a sliding tab tabbed pane according to an embodiment of the invention.

Next, the operation of the sliding tab tabbed pane 304 user interface component will be described with reference to FIGS. 4A to 4E. The term sliding tab refers to that location and size of a sliding tab may be adjusted, and therefore a sliding tab which is moved in the tabbed pane appears to be sliding.

FIGS. 4A to 4E illustrate a tabbed pane user interface component providing items belonging to a number of different categories. Each category is associated with a sliding tab: a 'videos' tab 400, a 'music' tab 402, and a 'docs' tab 404. When describing the operation of the sliding tab tabbed pane 304 user interface component with reference to FIGS. 4A to 4E, a three-dimensional approach will be used. The sliding tabs may be moved upwards or downwards in the display unit, and they may be moved on top of or behind each other. The latter is considered as moving the sliding tabs in depth direction. The sliding tab tabbed pane 304 may be considered as a user interface component comprising a number of tabs layered on top of each other such that the portion of a tab which is the topmost is being displayed in the display unit of the electronic device.

In FIGS. 4A to 4E the sliding tab tabbed pane 304 is arranged such that the sliding tabs are located vertically on top of each other. The tabbed pane may also be arranged such that sliding tabs are located horizontally on top of each other, or it can be arranged such that the sliding tabs are located both horizontally and vertically on top of each other.

In FIG. 4A, the 'videos' tab 400 is the topmost sliding tab with its contents shown. The contents of the 'music' tab 402 and the 'docs' tab are hidden behind the topmost 'videos' tab 400. Only a small portion of the two hidden sliding tabs 402, 404 is visible and the contents of the hidden sliding tabs 402, 404 may be accessed by selecting the visible part of a desired sliding tab. The visible part of a hidden sliding tab may comprise text or an icon describing the contents of the tab. FIG. 4A illustrates sliding tabs arranged on top of each other, just as in the conventional tabbed pane user interface component. With the sliding tab tabbed pane user interface component, however, the contents of multiple sliding tabs may be displayed simultaneously.

When a user wants to select another sliding tab as the topmost tab, the user may select a visible part of the desired tab and the tab will become the topmost tab and display its contents. In FIG. 4B, another ('music' tab 402) tab is open and its contents are visible along with the contents of the 'videos' tab 400. In FIG. 4C the third tab ('docs' tab 404) is selected to be the topmost tab. Now the 'videos' tab 400 is behind the 'music' tab 402 and the 'docs' tab 404. The 'videos' tab may be selected to be the topmost tab by selecting the text or icon describing the contents of the tab. A tab may be moved behind the other tabs by first selecting it to be the topmost tab and then selecting it again. For example, the topmost tab of FIG. 4C ('docs' tab 404) may be moved behind the other tabs by selecting the icon describing the contents of the 'docs' tab 404.

The size of the tabs may be adjusted manually for example by dragging the title bar of the tab whose size is to be adjusted. For example, the size of the 'music' tab 402 in FIG. 4C may be increased by dragging the title bar of the 'music' tab 402 upwards. This decreases the size of the 'videos' tab 400 while the size of the 'docs' tab remains the same. Correspondingly, the size of the 'videos' tab 400 may be increased and the size of the 'music' tab 402 decreased by dragging the 'music' tab 402 downwards. When the title bar of the 'music' tab 402 touches the title bar of the 'docs' tab 404, the title bar of the 'docs' tab 404 may be pushed downwards as well. Thus, the contents of the 'music' tab 402 are not visible, since they are behind the 'docs' tab 404, and the size of the 'docs' tab 404 is decreased'.

Instead of manual changing of the sizes of the sliding tabs 400, 402, 404, the sizes of the sliding tabs may be adjusted automatically The sizes of the sliding tabs may be adjusted for example when a tab is selected as the topmost tab. Then the sizes of sliding tabs whose contents are visible may be adjusted according to a known criterion. The criterion may be to allocate an equal amount of space to each tab, for example. Other ways to adjust the size of the tabs automatically are also possible.

If the contents of a sliding tab do not fit into the space available for the tab, a scroll bar or an equivalent user interface component may be used to access the hidden contents of an active tab. In the example of FIGS. 4A to 4D scroll bars 410, 414, and 416 are used to access the hidden contents of the tabs 400 to 404. Similarly, some other corresponding user interface component may be used.

Figure 4E:
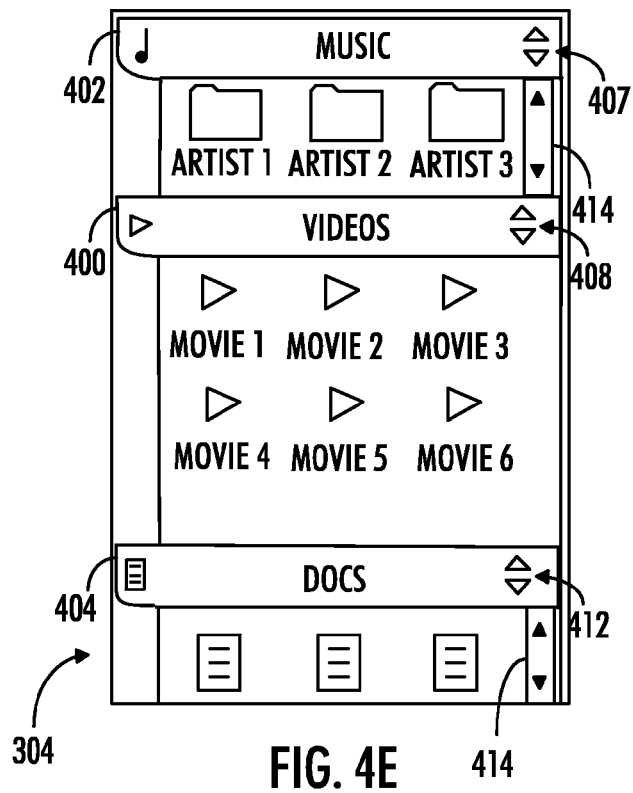
FIG. 4E illustrates an example of a sliding tab tabbed pane user interface component according to an embodiment of the invention.

It is also possible to change the order of the sliding tabs. A sliding tab 400, 402, 404 may be provided with an order selection component 407, 408, 412, which may be used to change the order of the sliding tabs 400, 402, 404. In our example illustrated in FIGS. 4A to 4E the order selection component has been implemented with dual arrows 407, 408, 412 indicating the direction of the order change. By selecting an arrow pointing upwards, the sliding tab whose order selection component is selected changes place with the sliding tab above it. By selecting an arrow pointing downwards, the sliding tab whose order selection component is selected changes place with the sliding tab below it. For example, by selecting the upward arrow of the 'music' tab 402, the 'music' tab 402 and the 'videos' tab 400 change places. As can be seen in FIG. 4E, the two sliding tabs change places such that their sizes also change. After the change, the size of the 'videos' tab 400 becomes the size of the 'music' tab 402. The order of the sliding tabs may be changed as described above in order that the tab that is moved above or below another tab would remain visible and not be moved out of the display area.

Additionally, when the order of the sliding tabs is changed by selecting an order selection component of a tab, the tab whose order selection component was selected, may be automatically selected to move over the tab it changes places with. Thus, particularly in the case when a tab is moved downwards, the title bar of the sliding tab whose order selection component was selected would remain visible. The tab may be moved in depth direction just enough to leave its title bar visible. Therefore, it is not necessary to move the tab to the topmost tab.

When a tab is moved upwards by using its order selection component, the tab, whose order selection component was selected, may be moved automatically behind the tab it changes places with. Thus, the title bars of both tabs remain visible. Alternatively, moving tabs in depth direction may be omitted, when a tab changes places with a tab above it. After the change, the tab that moved upwards is then over the tab it changed places with, thus blocking the title bar of the other tab out of sight.

Instead of providing an order selection component in the title bars of the sliding tabs, the order change may be implemented in an alternative way. For example, a separate window may be provided for changing the order of the sliding tabs.

Moving or copying items from one tab to another is also simple. The user may select an item from a sliding tab and move it to another tab by using a drag-and-drop mechanism. If both the source and the target tab of the move or copy operation are visible, i.e. not behind another tab or tabs, the user may simply select an item from the source tab and move it to the target tab. If the user wants to move or copy an item to a sliding tab which is behind other sliding tabs, it is also possible by using the drag-and-drop mechanism. First, the user may select the item to be moved to another tab. Next, the user may drag the item over the visible part of the tab where the item is to be moved (the visible part of 'docs' tab 404 in FIG. 4B). When the item is over the visible part of the tab which is behind the other tabs, the user may release the item and the item is automatically moved or copied to the desired tab. Alternatively, when the item is over the visible part of the tab which is behind the other tabs, the tab may be automatically moved in depth direction such that its contents are at least partly visible. This is particularly useful when the item is to be moved to a directory of a sliding tab which is behind other tab or tabs.

The drag-and-drop mechanism may be carried out by the user using a mouse, for example, or an equivalent peripheral component. In an electronic device comprising a touch sensitive display the drag-and-drop mechanism may be carried out for example by using a stylus. The mechanism is here described for a mouse but one skilled in the art will recognize the similarities to a stylus used with a touch sensitive display and to other corresponding solutions, too.

When the user wishes to move or copy an item from one tab to another by using the drag-and-drop mechanism, the user moves the mouse cursor over the item and presses down a selection button of the mouse. With the button pressed down the user drags the item over another tab and releases the button. The item is then moved or copied to another tab. As a default of the operating system of the electronic device, the mechanism described above may be used either for moving or copying an item from one tab to another. To carry out the other operation the user may then have to hold down a keyboard button, for example, on for the duration of the drag-and-drop procedure. This is, however, a matter of implementation of the drag-and-drop mechanism and thus does not limit the scope of the invention in any way.

In the above examples the sliding tabs are described as overlapping components, i.e. on top of each other. Alternatively, the sliding tabs may be arranged such that they are located next to each other and not overlapping. This arrangement will look the same in the display unit, i.e. as if the sliding tabs were overlapping and only the topmost portion of a sliding tab were displayed.

Figure 5:
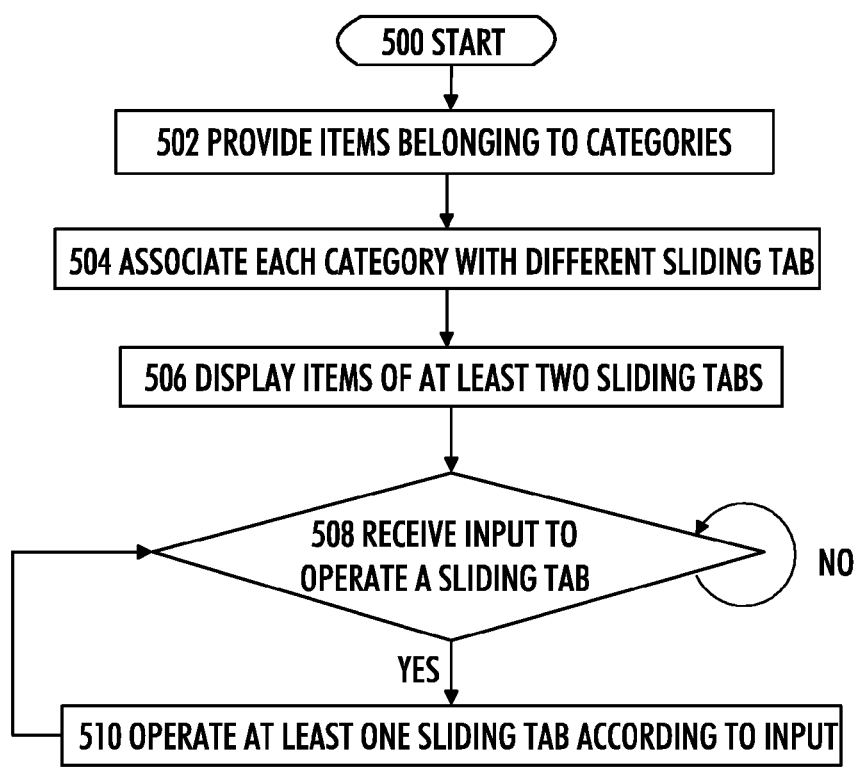
FIG. 5 is a flow diagram illustrating a process for processing data in an electronic device.

Next, a process for displaying the contents of several tabs simultaneously in an electronic device will be described with reference to FIG. 5. The process starts in 500. Items belonging to a plurality of different categories are provided in 502. The items are provided in a display unit of an electronic device. In step 504, each category is associated with a different sliding tab of a tabbed pane user interface component.

The sliding tabs are arranged in step 506 such that at least a portion of the items of at least two sliding tabs are visible. The sliding tabs may be arranged such that they overlap at least partly and the contents of the topmost sliding tab or tabs are at least partly displayed in the display unit.

In step 508 it is checked whether an input is received through a user interface of the electronic device. The input may relate to a sliding tab or tabs or items belonging to at least one sliding tab. The input may relate to adjusting the size of a sliding tab, selecting a sliding tab to become as the topmost tab, selecting the topmost sliding tab to be moved behind the other tabs, changing the order of the sliding tabs, or moving or copying an item from a source sliding tab to a target sliding tab. If such an input is received, the process moves to step 510, where the operation corresponding to the input is carried out. From 510 the process moves back to step 508.

The electronic device of the type described above may be used for implementing the method, but also other types of electronic devices may be suitable for the implementation. In an embodiment, a computer program product encodes a computer program of instructions for executing a computer process of the above-described method of processing data in an electronic device. The computer program product may be implemented on a computer program distribution medium.

The computer program distribution medium includes all manners known in the art for distributing software, such as a computer readable medium, a program storage medium, a record medium, a computer readable memory, a computer readable software distribution package, a computer readable signal, a computer readable telecommunication signal, and a computer readable compressed software package.

Even though the invention is described above with reference to an example according to the accompanying drawings, it is clear that the invention is not restricted thereto but it can be modified in several ways within the scope of the appended claims.

The invention claimed is:

1. A method comprising:
    providing a user interface of an electronic device with items belonging to a plurality of different categories,
    associating each category with a different sliding tab of a tabbed pane user interface component wherein the items belonging to a category are displayed at least in part with the sliding tab associated with the category and the items belonging to a category relocate with relocation of the associated sliding tab, and
    arranging the sliding tabs such that the sliding tabs are layered on top of each other and at least a portion of the items of at least two sliding tabs including the topmost sliding tab are visible.

2. The method of claim 1, further comprising:
    receiving an input to adjust the size of a selected sliding tab;
    adjusting the size of the selected sliding tab according to the received input;
    adjusting the size of at least one other sliding tab, while adjusting the size of the selected sliding tab.

3. The method of claim 2, further comprising:
    moving at least one other sliding tab while adjusting the size of the selected sliding tab.

4. The method of claim 1, further comprising:
    receiving an input to move a selected sliding tab as the topmost sliding tab;
    moving the selected sliding tab as the topmost sliding tab by moving the selected sliding tab over at least one other sliding tab.

5. The method of claim 1, further comprising:
    receiving an input to move a selected topmost sliding tab behind the other sliding tabs;
    moving the selected sliding tab behind the other sliding tabs.

6. The method of claim 1, further comprising:
    receiving an input to change the order of the sliding tabs;
    changing the order of the sliding tabs by changing the places of at least two sliding tabs according to the input.

7. The method of claim 6, further comprising:
    receiving an input to move a selected sliding tab forward in the tab order;
    moving the selected sliding tab forward in the tab order by changing its place with the sliding tab next in the tab order;
    moving the selected tab over the sliding tab with which the selected sliding tab changes places.

8. The method of claim 6, further comprising:
    receiving an input to move a selected sliding tab backwards in the tab order;
    moving the selected sliding tab backwards in the tab order by changing its place with the sliding tab preceding in the tab order.

9. The method of claim 8, further comprising:
    moving the selected tab behind the sliding tab with which the selected sliding tab changes places.

10. The method of claim 1, further comprising:
    providing the user interface with a user interface component for displaying hidden contents of a sliding tab in case all the contents of the sliding tab do not fit in the space allocated to the sliding tab.

11. The method of claim 1 further comprising:
    receiving an input to move or copy an item from a source sliding tab to a target sliding tab;
    receiving an input to move the item that is to be moved or copied over the visible part of the target sliding tab,
    moving the target sliding tab over at least one other sliding tab such that at least a portion of the contents of the target sliding tab becomes visible.

12. An electronic device comprising:
    a user interface for input and output of information;
    at least one processor; and
    memory including computer program code, the memory and the computer program code configured to, with the at least one processor, cause the electronic device at least to:
        provide the user interface with items belonging to a plurality of different categories,
        associate each category with a different sliding tab of a tabbed pane user interface component wherein the items belonging to a category are displayed at least in part with the sliding tab associated with the category and the items belonging to a category relocate with relocation of the associated sliding tab, and
        arrange the sliding tabs such that the sliding tabs are layered on top of each other and at least a portion of the items of at least two sliding tabs including the topmost sliding tab are visible.

13. The electronic device of claim 12, herein the control unit is further configured to
    receive an input to adjust the size of a selected sliding tab;
    adjust the size of the selected sliding tab according to the received input;
    adjust the size of at least one other sliding tab, while adjusting the size of the selected sliding tab.

14. The electronic device of claim 13, wherein the control unit is further configured to move at least one other sliding tab while adjusting the size of the selected sliding tab.

15. The electronic device of claim 12, wherein the control unit is further configured to:
    receive an input to move a selected sliding tab as the topmost sliding tab;
    move the selected sliding tab as the topmost sliding tab by moving the selected sliding tab over at least one other sliding tab.

16. The electronic device of claim 12, wherein the control unit is further configured to
    receive an input to change the order of the sliding tabs;
    change the order of the sliding tabs by changing the places of at least two sliding tabs according to the input.

17. The electronic device of claim 16, wherein the control unit is further configured to
    receive an input to move a selected sliding tab forward in the tab order;
    move the selected sliding tab forward in the tab order by changing its place with the sliding tab next in the tab order;
    move the selected tab over the sliding tab with which the selected sliding tab changes places.

18. The electronic device of claim 16, wherein the control unit is further configured to
    receive an input to move a selected sliding tab backward in the tab order;
    move the selected sliding tab backwards in the tab order by changing its place with the sliding tab preceding in the tab order.

19. The electronic device of claim 18, wherein the control unit is further configured to move the selected tab behind the sliding tab with which the selected sliding tab changes places.

20. The electronic device of claim 12, wherein the control unit is further configured to provide the user interface with a user interface component for displaying hidden contents of a sliding tab in case all the contents of the sliding tab do not fit in the space allocated to the sliding tab.

21. The electronic device of claim 16, wherein the control unit is further configured to:
    receive an input to move or copy an item from a source sliding tab to a target sliding tab;
    receive an input to move the item which is to be moved or copied over the visible part of the target sliding tab,
    move the target sliding tab over at least one other sliding tab such that at least a portion of the contents of the target sliding tab becomes visible.

22. An electronic device comprising:
    display means for displaying information;
    means for providing in the display means items belonging to a plurality of different categories,
    means for associating each category with a different sliding tab of a tabbed pane user interface component wherein the items belonging to a category are displayed at least in part with the sliding tab associated with the category and the items belonging to a category relocate with relocation of the associated sliding tab, and
    means for arranging the sliding tabs such that the sliding tabs are layered on top of each other and at least a portion of the items of at least two sliding tabs including the topmost sliding tab are visible in the display means.

23. The electronic device of claim 22, wherein the electronic device further comprises:
    input means for inputting information;
    means for receiving an input to move or copy an item from a source sliding tab to a target sliding tab;
    means for receiving an input to move the item which is to be moved or copied over the visible part of the target sliding tab,
    means for moving the target sliding tab over at least one other sliding tab such that at a least portion of the items of the target sliding tab becomes visible in the display means.

24. A non-transitory computer program distribution medium readable by a computer and encoding a computer program of instructions for executing a computer process for processing data, the process comprising:
    providing a user interface of an electronic device with items belonging to a plurality of different categories,
    associating each category with a different sliding tab of a tabbed pane user interface component wherein the items belonging to a category are displayed at least in part with the sliding tab associated with the category and the items belonging to a category relocate with relocation of the associated sliding tab, and
    arranging the sliding tabs such that the sliding tabs are layered on top of each other and at least a portion of the items of at least two sliding tabs including the topmost sliding tab are visible.

25. The non-transitory computer program distribution medium of claim 24, wherein the process further comprises:
    receiving an input to move or copy an item from a source sliding tab to a target sliding tab;
    receiving an input to move the item which is to be moved or copied over the visible part of the target sliding tab,
    moving the target sliding tab over at least one other sliding tab such that at least a portion of the items of the target sliding tab becomes visible.

* * * * *